April 26, 1960  S. SERVENTI ET AL  2,934,225
METHOD AND APPARATUS FOR FEEDING BATCH MATERIALS
Filed March 24, 1953  2 Sheets-Sheet 1
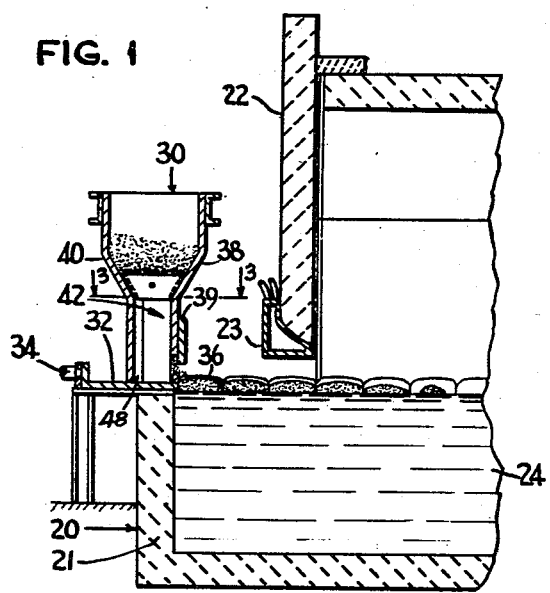
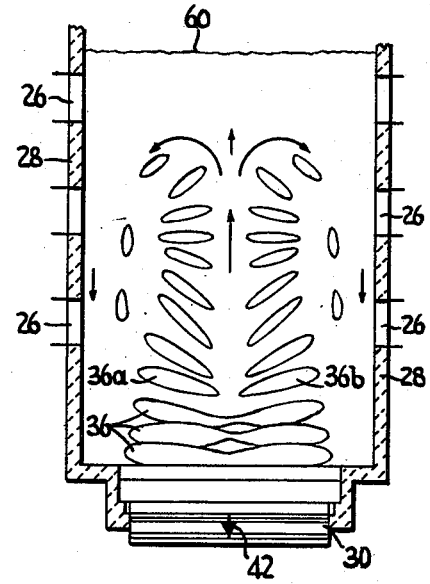
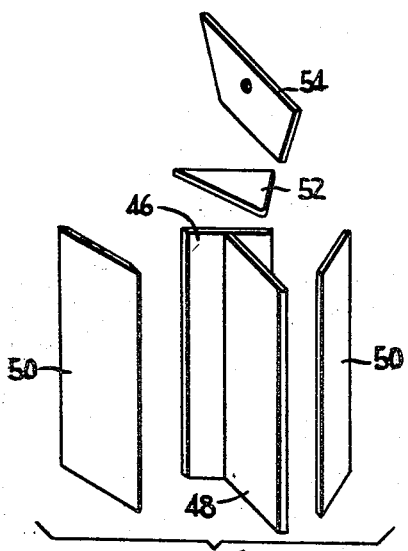
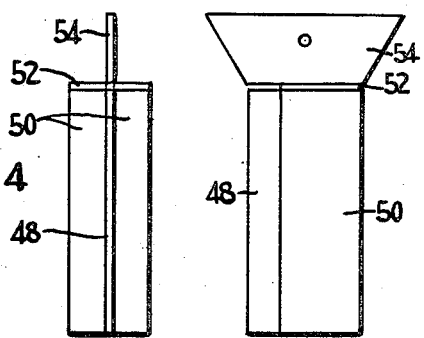
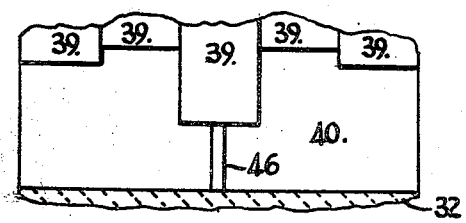
INVENTOR.
SERAFINE SERVENTI and
JACK SCHWEPPE
BY
Oscar L. Spencer
ATTORNEY INVENTORS
SERAFINE SERVENTI and
JACK SCHWEPPE United States Patent Office 2,934,225
Patented Apr. 26, 1960

2,934,225

METHOD AND APPARATUS FOR FEEDING BATCH MATERIALS

Serafine Serventi, Creighton, Pa., and Jack Schweppe, Shelbyville, Ind., assignors to Pittsburgh Plate Glass Company Application March 24, 1953, Serial No. 344,336

9 Claims. (Cl. 214—18)

This invention relates to an improvement in apparatus for feeding granular batch material to a molten bath of the same in the manufacture of glass and the like and in an improved method utilizing the improved apparatus.

One object of the present invention is to provide an improved method of feeding batch material into a melting tank and controlling the action of the batch materials within the tank in such a manner as to insure a uniform melting of the batch ingredients within the tank to form molten glass.

Another object of the invention is to provide a method of uniformly and progressively feeding glass batch material into a melting tank in such manner as to insure melting of the material at lower temperatures than those presently required for melting the batch material.

Another object of the present invention is to provide an improved method of successively feeding layers of glass batch material into a melting tank to form a blanket of batch material that it progressively melted as the batch material is moved toward the drawing end of the tank and which requires a minimum of assistance on the part of batch feed operators in order to provide this uniform melting.

In present conventional operation, a uniformly thick and uniformly wide quantity of batch materials is periodically fed into a glass melting tank, thereby forming logs of batch material having a length substantially equal to the width of the melting tank. As each successive log is formed, it forces the previously fed log forward into the melting zone of the tank and enables the log to be uniformly melted. Such a feeding system provides a fairly uniform blanket of batch materials which, under ordinary conditions within a tank having perfect insulation properties, enables a uniform melting of the batch material to be obtained. The dimensions of the logs of batch ingredients gradually lessen as the batch progresses down the tank finally the entire batch is melted.

In actual practice, however, the insulation properties on one side of a melting tank are usually different from those on the other side, and consequently there is a considerable variation in the temperature of the molten glass beneath the logs formed from one side of the melting tank to the other. Since the viscosity of the molten glass is inversely proportional to the temperature, there is a tendency for these logs of batch material to be rotated toward the portion of the tank at the lower temperature. The result of such rotation requires the constant surveillance of one or more assistants to maintain the logs in transverse alignment across the tank. Another consequence of the tendency of the logs to rotate and their subsequent manipulation is the breaking off of small portions of batch from the logs and the conveyance of these portions toward the drawing end of the furnace without completely melting the latter. This latter consequence results in the formation of stones in the rough rolled glass that is drawn from the tank.

This invention provides a unique structural arrangement for inclusion in an otherwise conventional hopper feeder for batch material which enables the logs of batch material applied to the surface of the molten bath within the furnace to be relatively thin at the central portion thereof. This enables the logs of batch material to be melted first at the central portion thereof, thereby forming two logs on either side of the center line of the furnace of a size that is small compared with that of the original unbroken logs. These smaller logs tend to melt more rapidly than the larger logs extending substantially completely across the width of the furnace.

In addition, there is a tendency for the undivided logs to rotate and oscillate from side to side in the melting end of the tank, thereby preventing efficient melting of the batch material. The smaller logs formed when the logs initially introduced into the melting end of the tank are divided follow the convection path of the molten glass and do not oscillate from side to side across the center line of the tank.

As long as the temperature conditions across the furnace are held even, very little manipulation of the logs by operators is necessary to maintain them in their optimum dispositions, which of course is very desirable. An uneven distribution of temperature with the resulting loss of symmetry of the convection currents will tend to veer the floating logs toward the cold side of the furnace much in the same manner as occurs with very wide logs, but it is much easier to straighten out these smaller logs formed after the central portion of the batch has been completely melted than logs which extend substantially entirely across the tank.

The basic principles of the present invention can be understood more clearly when the following description of a specific embodiment is studied together with the accompanying drawing.

In the drawing:

Figure 1 is a side sectional view of a portion of a typical tank showing the improved hopper means for intermittently feeding batch material into the feeding end of a glass forming tank;

Figure 2 is a partially schematic plan view showing the manner in which the logs of batch material are melted and follow the path of the convection currents present in the melting end of a tank;

Figure 3 is a cross-sectional view along the irregular lines 3—3 of Fig. 1 illustrating a method of attachment of a batch plow included in the present invention to the front and rear vertical walls of a hopper feeder mechanism;

Figures 4 and 5 are two vertical side views taken at right angles to each other and to the view of Figure 3, showing the detailed structure of the batch plow;

Figure 6 is an exploded isometric view of the portions comprising the batch plow; and Figure 7 is a frontal view showing the front wall of the hopper.

Figure 8:
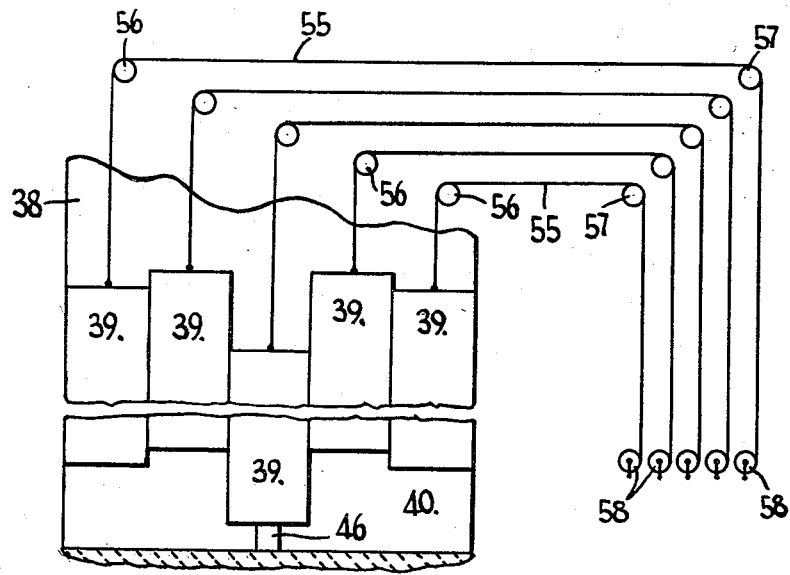
Fig. 8 is a schematic view showing means for adjusting the opening in the front vertical wall of the hopper mechanism.

Referring to the drawings, reference numeral 20 represents a glass melting tank provided with a feeding end 21, and a suspended back end wall 22 the lower end of which is provided with water fed coolers 23. During operation, the tank contains a bath of molten glass 24 which is maintained in a molten state by means of suitable fuel fed through ports 26 in the tank walls 28 (Fig. 2). A hopper mechanism 30 is continuously provided with batch ingredients, that are thoroughly ground and mixed, by means of a laterally and reciprocally moving conveyor feed mechanism (not shown). The hopper 30 extends substantially across the entire width of the entrance portion 21 of the tank. The batch material rests under gravity upon a horizontal reciprocable carrier or plate 32 which is coupled via a reciprocating shaft 34 to a reciprocating mechanism (not shown). The reciprocating plate 32 is reciprocable from the full line rearward position indicated in Figure 1 toward the right.

When the plate 32 is disposed in its full line position with the material from the hopper resting thereon, the forward horizontal movement of the plate to the broken line position indicated carries with it a predetermined layer 36 of the batch material.

The latter material is then positioned immediately overhanging the surface of the molten bath and the material in the hopper drops down upon the plate behind the portion which has been moved forwardly. When the plate 32 is retracted, by withdrawing it from the forward position to the full line position, the layer 36 cannot also be carried backwardly because the space previously occupied by this layer has been filled by the material dropped down behind it from the hopper by gravity. Thus, by withdrawing the plate 32, the batch layer 36 is dropped upon the molten bath from the forward plate edge until the plate is moved to its rearmost position. Thus the material is applied atop the molten glass surface substantially uniformly along its area corresponding in width to the amplitude of reciprocation of the plate 32.

Hopper 30 is provided with a front wall 38 and a rear wall 40. The rear wall 40 has its lower edge almost in frictional contact with the upper surface of the plate 32, thereby precluding rearward displacement of the batch from the hopper. In this manner, successive logs 36 of batch ingredients having a width substantially equal to the width of the entrance portion of the tank are sequentially fed into the melting tank upon each reciprocation of the reciprocating plate 32.

Another function performed by the plate 32 is to move previously deposited logs 36 forwardly within the tank toward the melting ports, thereby providing room for the deposit of each succeeding log. The aforementioned description describes a typical operation that is conventional and is included merely as a background for the presentation of the description of the present invention.

In order to provide logs having a thinner portion in the center than on either side so that the central portion of the logs are completely melted first a novel structure has been provided.

This novel structure includes the provision at the front side of the front hopper wall 38 of a plurality of vertically adjustable sliding gate members 39, which may have their settings arranged vertically in a predetermined manner in such positions as will be described more fully later.

This novel structure also comprises a plow shaped structure 42 which is centrally located laterally of the hopper 30. This batch plow 42 may be secured within the hopper to the front and rear walls 38 and 40 thereof by means of suitable brackets 44.

Referring to Figures 4, 5 and 6, batch plow 42 comprises a front wall portion 46, a vertical wall 48 extending perpendicularly from the central portion of front wall 46, and a pair of side walls 50 that are angularly disposed from each extremity of front wall 46 to vertical wall 48. A triangular top portion 52 is secured to walls 46, 48 and 50 and is shaped to fit the direction that walls 50 extend from wall 46 to wall 48. A tapered portion 54 provided with a lifting hole is secured to the top of triangular portion 52. All the elements are secured together either by welding or other suitable securing means to provide a unitary structure.

The batch plow 42 is seen to be triangular in cross-section and extends vertically with its front side 46 facing the apertured wall 38. The other two side walls 50 form a vertically extending wedge to the rear of said front wall. This wedge is removed from the aperture.

It is noted that the logs imparted into the tank extend virtually completely across the tank and have their central portion considerably thinner than the other sections of the logs. As seen in Figure 7, the height differential between the upper surface of the plate 32 on which the batch slides and the bottom of the gate members 39 defines an irregularly shaped opening through which the batch materials are shoved before they are disposed atop the surface of molten glass. The shape of this opening across the width of the hopper roughly defines the shape of the logs applied atop the molten glass surface.

The provision of the batch plow at the central portion of the hopper does not serve to part the long logs of batch materials imparted into the surface of the melt completely at the central portion thereof, but merely accentuates the thinness of the logs at their centers, as some of the granular batch material parted by the batch plow 42 tends to flow together in front of the latter as the batch is forwardly displaced toward the tank by the action of the slide member 32.

For example, a front hopper wall 20 feet in width may be divided into five sections, each section provided with a sliding gate member 39 having a width of 4 feet. The height of the opening of the central section wherein the batch plow is provided is 6 inches above the upper surface of the reciprocating slide member 32, the height of the opening of the two sections immediately adjacent the central section on either side thereof is 13 inches and the height of the opening of the extreme lateral portions is 12 inches. It has been discovered that this arrangement of entrance wall opening height provides a log that appears somewhat like two cigars that are attached end to end due to the ability of the finely granulated batch to flow around the plow somewhat during the displacement of the reciprocating plate 32.

A typical apparatus for adjusting the vertical position of the various sliding gate members 39 is shown schematically in Fig. 8. Each gate member is suspended from a chain 55. Each chain travels over pulleys 56 and 57 to an individually operated crank mechanism 58, the manipulation of which controls the vertical position of its associated sliding gate member. Each individual gate member 39 is a massive slab of steel so heavy in comparison to the batch material in the hopper that the pressure imparted by the batch material in the hopper fails to displace the gate members by an appreciable amount from the vertical position at which each gate member is normally suspended.

Referring now to Fig. 2, successive positions of a log 36 as it progresses down the tank are disclosed. It will be seen from a study of this drawing that the central portion of the batch material log is melted first, thereby breaking the log up into two smaller logs 36a and 36b on either side of the central line of the tank. The smaller logs formed by the breaking of the large logs initially fed into the melting furnace not only melt more easily than the larger undivided logs, but also more readily follow the natural flow of convection currents as depicted by the arrows in this drawing. Not only is there less tendency for the smaller logs to oscillate from one side of the tank to the other such as frequently occurs with the larger logs, but also in the event an imbalance of temperature takes place within the furnace, the smaller logs are much more easily manipulated by operators observing the action of the furnace than the larger undivided ones. Thus, by the time the batch ingredients have reached the foam line 60 of the furnace, slightly down from the No. 3 port position, all the batch ingredients are completely melted and a glass melt that is entirely free of stones is formed.

It is extremely important that the logs remain substantially continuous across the width of the tank until approximately the position of the first port is reached. This requirement is rendered necessary by the desire to maintain the heat of the molten glass within the volume of the glass and thereby effect a more efficient melting of the batch materials than would be effected should the central portion of the molten bath be completely uninsulated from the surrounding air, thereby giving rise to thermal imbalances which in turn cause the logs to veer away from a symmetrical pattern which is most efficient for adequate melting.

Another reason for having the logs remain continuous across the entire width of the tank in the region adjacent the hopper opening is to provide a continuous insulating blanket above the molten bath 24 in the region between the front hopper wall 38 and the suspended back end wall 22 of the furnace, the lower part of which is protected from the heat of the molten bath by means of the water coolers 23. The provision of a continuous blanket above the bath minimizes the heat loss caused by radiation of the heat from the molten glass to the air space between the hopper and the suspended back end wall.

While the invention has been described particularly with regard to its applicability in the operation of glass melting apparatus, it is to be understood that it is also applicable in other respects where it may be desirable to feed a blanket of granular material upon the molten bath. For example, the batch plow may be used in the manufacture of sodium silicate, or in the copper industry where it is desirable to feed a copper concentrate upon a molten copper bath.

Although a practical construction and method illustrating the invention have been shown and described in detail, it will be apparent to those skilled in the art that the invention is not so limited but that various changes may be made therein without departing from the spirit of the invention as embodied in the scope of the appended claims.

We claim:

1. The method of feeding granular batch materials to a molten bath containing the melted batch ingredients, comprising forming said granular batch materials into a log-shaped body including spaced large masses interconnected by a connecting portion of reduced cross-section, and depositing said shaped body on said molten bath with said reduced section disposed in a path of flow of said molten material, whereby said reduced section melts to separate said large masses of said body and causes said separated large masses to flow independently on said molten bath.

2. A method according to claim 1, wherein the step of depositing a log is periodically repeated.

3. In combination with a hopper feeder mechanism provided with a rear wall, and an apertured front wall having means associated therewith to provide a laterally disposed opening that is relatively restricted in the central portion thereof for the introduction of granular batch ingredients, a vertically extending structure of triangular cross-section having one side attached to said apertured wall in alignment with the center of said associated means and the other two sides of said structure forming a wedge to the rear and removed from said opening, said wedge substantially restricting the central portion of the vertically extending opening provided by said rear and front walls.

4. A hopper feeder mechanism provided with a first and second wall spaced from each other, a plurality of vertically slidable gate members in sliding relation with said first wall, means for securing each of said gate members in a fixed, independent, vertical relationship to said first wall, and a vertically disposed member substantially triangular in cross-section secured to the central portion of said first wall, said vertically disposed member substantially restricting the central portion of the vertical passageway provided by said first and second walls.

5. A hopper feeder mechanism provided with a first and second wall spaced from each other, a plurality of vertically slidable gate members in sliding relation with the outer surface of said first wall, said gate members arranged in side by side relationship across substantially the entire width thereof, means for securing each of said gate members in a fixed, independent, vertical relationship to a portion of the outer surface of said first wall, and a vertically disposed member substantially triangular in cross-section having a wall thereof secured to the inner surface of said first wall at the central portion thereof, said vertically disposed member substantially restricting the central portion of the vertical passageway provided by said first and second walls.

6. In a tank for continuously melting batch to form molten glass, a hopper feeder mechanism provided with a rear wall and an apertured front wall through which granular batch materials are adapted to be fed, the front wall being provided with a depending portion in the center to provide an opening for the passage of batch materials that is restricted in the central portion thereof.

7. A hopper feeder mechanism provided with a first and second wall spaced from each other to provide a vertical passageway, said first wall being provided with an opening affording access to and from said passageway, a plurality of vertically slidable gate members in sliding relation with the outer surface of said first wall, and overlying said opening, said gate members arranged in substantially contiguous side by side relationship across substantially the entire width of said opening, means for securing each of said gate members in a fixed, independent, vertical relationship to a portion of the outer surface of said first wall.

8. A hopper feeder mechanism provided with a rear wall and an apertured front wall spaced from said rear wall, a vertically extending structure of triangular cross-section having one side attached to said apertured front wall, two other sides of said structure forming a vertically extending wedge to the rear and removed from said aperture and a vertically extending reinforcing member extending from said first side to the rear wall.

9. A hopper feeding mechanism comprising a plurality of spaced wall members forming a passageway therebetween and providing a hopper, said hopper having an elongated opening affording access to and from said passageway to provide for the flow of material therethrough from said passageway, a plurality of movable gate members supported in movable relation with respect to one of said wall members and overlying said elongated opening to provide for movement of each of said gate members with respect to said elongated opening, said gate members being arranged in substantially contiguous side-by-side relationship across substantially the entire extent of said elongated opening, and means for selectively securing each of said gate members in a fixed, independent relationship and selective position with respect to said elongated opening to control the flow of material from said hopper therethrough.

References Cited in the file of this patent

UNITED STATES PATENTS

| | | |
|---|---|---|
| 1,037,480 | Hoeller | Sept. 3, 1912 |
| 1,138,663 | Kesty | May 11, 1915 |
| 1,176,878 | Anderson | Mar. 28, 1916 |
| 1,219,737 | Heilig | Mar. 20, 1917 |
| 1,267,004 | Slick | May 21, 1918 |
| 1,267,005 | Slick | May 21, 1918 |
| 1,880,287 | Sifton | Oct. 4, 1932 |
| 1,916,262 | Good | July 4, 1933 |
| 1,992,994 | Delpech | Mar. 5, 1935 |
| 2,178,320 | Bogumill | Oct. 31, 1939 |
| 2,272,217 | Longenecker | Feb. 10, 1942 |
| 2,281,050 | Redshaw | Apr. 28, 1942 |
| 2,423,192 | Korum | July 1, 1947 |
| 2,624,475 | Henry et al. | Jan. 6, 1953 |

FOREIGN PATENTS

| | | |
|---|---|---|
| 142,837 | Australia | Aug. 10, 1951 |
| 666,641 | Great Britain | Feb. 13, 1952 |

UNITED STATES PATENT OFFICE

CERTIFICATION OF CORRECTION

Patent No. 2,934,225  April 26, 1960

Serafine Serventi et al.

It is hereby certified that error appears in the above numbered patent requiring correction and that the said Letters Patent should read as corrected below.

Column 1, line 34, for "that it" read -- that is --; line 51, after "tank" insert -- until --.

Signed and sealed this 25th day of April 1961.

(SEAL)
Attest:

ERNEST W. SWIDER
Attesting Officer

DAVID L. LADD
Commissioner of Patents